(12) United States Patent
Smekhov et al.

(10) Patent No.: US 9,596,105 B1
(45) Date of Patent: Mar. 14, 2017

(54) TIME TRACKING SCHEMES FOR REDUCED ISI IN MULTI-TRANSMISSION-POINT OFDM SYSTEMS

(71) Applicant: Marvell International Ltd., Hamilton (BM)

(72) Inventors: Alexander Smekhov, Tel-Aviv (IL); Ronen Mayrench, Ra'anana (IL)

(73) Assignee: MARVELL INTENATIONAL LTD., Hamilton (BM)

( * ) Notice: Subject to any disclaimer, the term of this patent is extended or adjusted under 35 U.S.C. 154(b) by 0 days.

(21) Appl. No.: 14/956,475

(22) Filed: Dec. 2, 2015

Related U.S. Application Data

(60) Provisional application No. 62/088,018, filed on Dec. 5, 2014.

(51) Int. Cl.
| | |
|---|---|
| H04L 27/06 | (2006.01) |
| H04L 25/03 | (2006.01) |
| H04L 27/26 | (2006.01) |
| H04B 1/10 | (2006.01) |

(52) U.S. Cl.
CPC ..... *H04L 25/03159* (2013.01); *H04B 1/1027* (2013.01); *H04L 27/2649* (2013.01); *H04L 27/2662* (2013.01)

(58) Field of Classification Search
CPC .............................. H04L 25/067; H04L 1/0045
USPC ........ 375/340, 141, 260; 570/210, 208, 329; 370/210, 208, 329
See application file for complete search history.

(56) References Cited

U.S. PATENT DOCUMENTS

| | | | |
|---|---|---|---|
| 2010/0061223 A1* | 3/2010 | Kim ...................... | H04L 5/0044 370/208 |
| 2012/0063294 A1* | 3/2012 | Osterling .......... | H04W 56/0045 370/210 |
| 2015/0237478 A1* | 8/2015 | Razoumov ............ | H04W 4/023 455/456.1 |
| 2016/0013925 A1* | 1/2016 | Ma ........................ | H04B 7/022 370/329 |

OTHER PUBLICATIONS

TS 36.211, "3rd Generation Partnership Project; Technical Specification Group Radio Access Network; Evolved Universal Terrestrial Radio Access (E-UTRA); Physical channels and modulation", Release 12, version 12.3.0, 126 pages,Oct. 2014.

* cited by examiner

*Primary Examiner* — Khai Tran

(57) ABSTRACT

A method includes, in a receiver, receiving a superposition of multiple signals originating from multiple transmitters. A symbol interval of the superposition is transformed in the receiver into a frequency domain. A start time of the symbol interval to be transformed is set in accordance with a criterion that reduces Inter-Symbol Interference (ISI) in the transformed symbol interval. At least one of the multiple signals is demodulated in the receiver using the transformed symbol interval.

13 Claims, 2 Drawing Sheets

TIME TRACKING SCHEMES FOR REDUCED ISI IN MULTI-TRANSMISSION-POINT OFDM SYSTEMS

CROSS-REFERENCE TO RELATED APPLICATIONS

This application claims the benefit of U.S. Provisional Patent Application 62/088,018, filed Dec. 5, 2014, whose disclosure is incorporated herein by reference.

FIELD OF THE DISCLOSURE

The present disclosure relates generally to wireless communication, and particularly to methods and systems for time tracking in wireless receivers.

BACKGROUND

In some wireless communication protocols, a wireless terminal is required to receive and process signals from multiple cells simultaneously, e.g., in order to demodulate their transmissions or in order to perform interference cancellation. Such requirements are specified, for example, in advanced versions of the Evolved Universal Terrestrial Radio Access (E-UTRA) standards, also referred to as Long Term Evolution (LTE) or LTE-Advanced (LTE-A), such as in "3rd Generation Partnership Project; Technical Specification Group Radio Access Network; Evolved Universal Terrestrial Radio Access (E-UTRA); Physical channels and modulation (Release 12)," TS 36.211, version 12.3.0, September, 2014, which is incorporated herein by reference.

The description above is presented as a general overview of related art in this field and should not be construed as an admission that any of the information it contains constitutes prior art against the present patent application.

SUMMARY

An embodiment that is described herein provides a method including, in a receiver, receiving a superposition of multiple signals originating from multiple transmitters. A symbol interval of the superposition is transformed in the receiver into a frequency domain. A start time of the symbol interval to be transformed is set in accordance with a criterion that reduces Inter-Symbol Interference (ISI) in the transformed symbol interval. At least one of the multiple signals is demodulated in the receiver using the transformed symbol interval.

In an embodiment, setting the start time includes identifying, from among at least a subset of the multiple signals, a signal having an earliest arrival time, and setting the start time in accordance with the earliest arrival time. In another embodiment, setting the start time includes identifying and setting the start time that optimizes a received data throughput of the receiver. In yet another embodiment, setting the start time includes synchronizing the start time with a signal having a highest Signal to Noise Ratio (SNR) among the multiple signals.

In a disclosed embodiment, the multiple signals originate from respective cells of a wireless network, a signal among the multiple signals originates from a serving cell that is assigned to serve the receiver in the wireless network, and setting the start time includes identifying and setting the start time that minimizes the ISI inflicted on the signal originating from the serving cell.

In some embodiments, setting the start time includes identifying and setting the start time that minimizes the ISI inflicted on any of the signals. In an embodiment, identifying the start time includes finding the start time that minimizes a worst-case Error Vector Magnitude (EVM) induced by the ISI in any of the signals. In an alternative embodiment, identifying the start time includes finding the start time that maximizes a worst-case Signal to Interference and Noise Ratio (SINR) caused by the ISI in any of the signals.

In another embodiment, finding the start time includes weighting respective SINRs of the signals with respective weights, and finding the start time that maximizes a worst-case among the weighted SINRs. In yet another embodiment, identifying the start time includes finding the start time that minimizes a worst-case residual noise power induced by the ISI in any of the signals.

In still another embodiment, setting the start time includes identifying and setting the start time that minimizes a total noise power induced by the ISI in the multiple signals. In an example embodiment, the multiple signals originate from respective cells of a wireless network, one of the multiple signals originates from a serving cell that is assigned to serve the receiver in the wireless network, and setting the start time includes choosing for the receiver a timing that is not synchronized with the serving cell.

There is additionally provided, in accordance with an embodiment that is described herein, an apparatus including a receiver front end and processing circuitry. The receiver front end is configured to receive a superposition of multiple signals originating from multiple transmitters. The processing circuitry is configured to transform a symbol interval of the superposition into a frequency domain, to set a start time of the symbol interval to be transformed in accordance with a criterion that reduces Inter-Symbol Interference (ISI) in the transformed symbol interval, and to demodulate at least one of the multiple signals using the transformed symbol interval.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION

Figure 1:
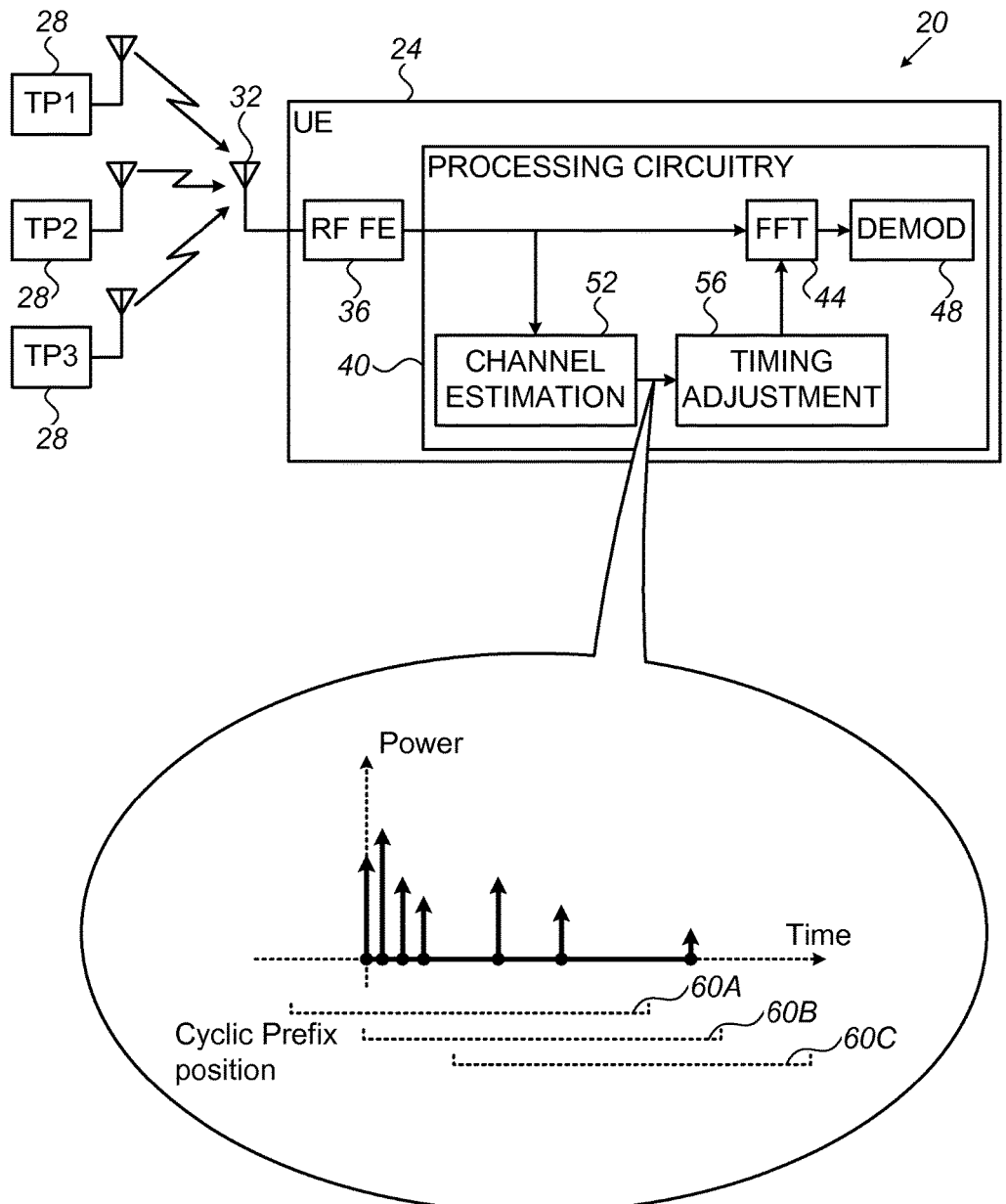
FIG. 1 is a block diagram that schematically illustrates a wireless communication network, in accordance with an embodiment that is described herein.

Embodiments that are described herein provide improved methods and systems for simultaneous reception of signals from multiple Transmission Points (TPs). The methods and systems described herein can be used, for example, in a wireless communication terminal that is required to receive signals from multiple base stations simultaneously, e.g., for reception of data using Coordinated Multipoint (COMP) or for interference cancellation.

In some embodiments described herein, a receiver of a wireless communication terminal is configured to simultaneously receive multiple Orthogonal Frequency Division Multiplexing (OFDM) signals from multiple TPs. The receiver transforms the entire received signal, including the multiple signals originating from the multiple TPs, into the frequency domain using a single Fast Fourier Transform (FFT). The receiver then demodulates the various signals from the FFT output. The receiver typically applies the FFT to one OFDM symbol interval at a time, and then decodes the OFDM sub-carriers of that OFDM symbol.

A single-FFT implementation of this sort implies that the receiver applies the same timing and frequency synchronization to the multiple signals being transformed. In practice, however, signals from different TPs are likely to arrive at the receiver with different time and frequency offsets. Given the differing time and frequency offsets, the FFT cannot be synchronized simultaneously to all the multiple signals. This lack of synchronization introduces various impairments into the FFT output, and thus degrades the receiver's demodulation performance.

One type of impairment, which cannot be corrected by post-processing of the FFT output, is Inter-Symbol Interference (ISI) caused by timing offset. When applying FFT to the signal of a given TP, ISI will be minimal when the time interval provided to the FFT is perfectly synchronized to the symbol timing of the signal. Such timing is referred to herein as nominal timing or zero timing offset. When the actual timing of the FFT deviates from the nominal timing, in either direction, the level of ISI increases.

In the present context, providing to the FFT a time interval that precedes the nominal timing, i.e., beginning the FFT later than the nominal timing, is referred to as a negative timing offset. Providing the FFT with a time interval that starts later than the nominal timing, i.e., beginning the FFT earlier than the nominal timing, is referred to as a positive timing offset.

In an example scenario, one of the TPs is the terminal's serving cell, and the receiver is time-synchronized to the signal received from the serving cell. In this scenario, a signal from another TP that arrives earlier than the serving cell signal will have a negative timing offset. A signal from another TP that arrives later than the serving cell signal will have a positive timing offset. It can be shown that the ISI caused by negative timing offset is considerably more severe than ISI caused by positive timing offset.

In some embodiments that are described herein, the receiver receives a signal, in which each symbol interval comprises respective signals from multiple TPs that typically differ in timing. The receiver adaptively sets the timing (e.g., start times) of the symbol intervals provided to the FFT in a manner that reduces ISI.

Various example schemes and criteria for setting the FFT timing based on the received signal are described herein. Typically, the receiver estimates the channel delay profile of the wireless channel of each TP, and sets the FFT timing based on the estimated channel delay profiles.

In some embodiments, the receiver identifies the signal having the earliest arrival time, and synchronizes the FFT start time to the beginning of the OFDM symbol of that signal. This scheme substantially eliminates negative timing offsets and the associated impairments. The receiver may define the arrival time, for example, as the timing of the earliest tap in the signal's channel delay profile, or as some weighted average (e.g., center-of-mass) of the taps in the channel delay profile. In some embodiments the receiver identifies the earliest signal among only a partial subset of the multiple signals, e.g., among the signals having sufficiently high Signal to Noise Ratio (SNR) or among the signals whose transmissions are relevant to the receiver (for demodulation or for interference cancellation).

In other embodiments, the receiver sets the FFT timing in a manner that does not eliminate negative timing offsets, but rather balances the impact of negative and positive timing offsets. In an example embodiment, the receiver sets the FFT timing to a value that optimizes some reception performance measure, such as received data throughput. In yet other embodiments, the receiver sets the FFT timing in a manner that minimizes the worst-case ISI, i.e., minimizes the ISI inflicted on any of the multiple signals.

In summary, the techniques described herein enable the receiver to demodulate multiple signals from multiple TPs simultaneously using a single FFT, while at the same time reducing the impact of ISI.

FIG. 1 is a block diagram that schematically illustrates a wireless communication network 20, in accordance with an embodiment that is described herein. In the present example, network 20 is a cellular network operating in accordance with the LTE-A specifications cited above. In alternative embodiments, however, the disclosed techniques can be applied in wireless networks that operate in accordance with any other suitable communication protocol. Some such protocols are suitable for Internet-of-Things (IoT) or Machine-Type Communication (MTC) applications and devices.

System 20 comprises a wireless communication terminal 24 that receives downlink OFDM signals from multiple Transmission Points (TPs) 28 simultaneously. In the present example, TPs 28 comprise LTE-A base stations (referred to as eNodeB), and terminal 24 comprises an LTE-A User Equipment (UE). UE 24 may comprise, for example, a cellular phone, a smartphone or a wireless-enabled tablet or other computing device, or an IoT or MTC device. In alternative embodiments, terminal 24 may comprise any other suitable wireless terminal, and TPs 28 may comprise any other suitable type of TPs. FIG. 1 shows three TPs by way of example. In alternative embodiments, UE 20 may receive any other suitable number of TPs simultaneously.

In the embodiment of FIG. 1, UE 20 comprises at least one antenna 32, a Radio-Frequency Front End (RF FE) 36 (also referred to as a receiver front end), and processing circuitry 40. Antenna 32 receives the OFDM downlink signals from TPs 28. RF FE 36 amplifies, filters, down-converts and digitizes the received signals, so as to produce a digital baseband signal that comprises a superposition of the multiple signals received from the multiple TPs. This digital signal is provided to processing circuitry 40 for processing.

In the present example, processing circuitry 40 comprises a Fast Fourier Transform (FFT) module 44 that transforms the digital baseband signal, OFDM symbol by OFDM symbol, into the frequency domain. A demodulator 48 then demodulates the OFDM symbols of the various signals.

In some embodiments, processing circuitry 40 adjusts the timing of FFT module 44, e.g., the start times of the symbol intervals to be transformed by the FFT module, in a manner that aims to minimize Inter-Symbol Interference (ISI). Typically, processing circuitry 40 comprises a channel estimation module 52 and a timing adjustment module 56. Channel estimation module 52 estimates the channel delay profile for the wireless channel of each TP 28. Timing adjustment module 56 sets the timing of FFT module 44 based on the multiple channel delay profiles. Example reduced-ISI timing schemes are described in detail below.

The configurations of system 20, UE 24 and their components, e.g., processing circuitry 40, as shown in FIG. 1, are simplified example configurations that are depicted solely for the sake of conceptual clarity. In alternative embodiments, any other suitable configurations can be used. For example, the partitioning of processing circuitry 40 into modules may be performed in any other suitable manner.

Some UE elements that are not mandatory for understanding of the disclosed techniques have been omitted from the figure for the sake of clarity. For example, since the disclosed techniques focus mainly on signal reception, signal transmission elements of the UE have been omitted for clarity.

The different elements of UE 24 may be implemented using dedicated hardware, such as using one or more RF Integrated Circuits (RFICs), Application-Specific Integrated Circuits (ASICs) and/or Field-Programmable Gate Arrays (FPGAs) in various embodiments. Alternatively, some elements may be implemented using software executing on programmable hardware, or using a combination of hardware and software elements. In some embodiments, some or all of the elements of UE 24 are fabricated in a signal-processing chip-set.

When implementing some or all of the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

In some embodiments, UE 24 is expected to demodulate the signals of multiple (e.g., all) signals received from the multiple TPs 28. In some embodiments, the multiple TPs coordinate their transmissions to UE 24, e.g., in various Coordinated Multipoint (COMP) schemes. In such cases, the multiple TPs transmit data that the UE is expected to demodulate and consume.

In other embodiments, the UE carries out an interference cancellation scheme that involves demodulation of signals from interfering TPs in order to cancel them. Example interference cancellation schemes of this sort comprise "Further enhanced Inter-Cell Interference Coordination" (FeICIC) and Network-Assisted Interference Cancellation and Suppression (NAICS).

In any of these embodiments, RF FE 36 receives a signal that comprises a superposition of multiple OFDM signals originating from multiple respective TPs 28, and processing circuitry 40 demodulates the multiple OFDM signals simultaneously. Among other tasks, FFT module 44 transforms the received superposition of signals, one OFDM symbol interval at a time, into the frequency domain. Demodulator 48 then demodulates the multiple OFDM signals from the FFT output.

The OFDM signals from the different TPs typically arrive at UE 24 with different time and frequency offsets. The differences in timing and frequency may be caused, for example, by differences in distance between the UE and the TPs, by timing and frequency offsets between TPs, or for any other reason.

When FFT module 44 applies FFT to the superposition of such signals, the FFT timing (e.g., the start time of the OFDM symbol interval being transformed) cannot be synchronized to all signals, meaning that one or more of the signals will be transformed with some timing offset. For example, when the intended start time for the FFT is the end of the Cyclic Prefix (CP) that precedes the OFDM symbol, i.e., the beginning of the actual OFDM symbol, this condition cannot be met for all signals.

This lack of synchronization introduces various impairments into the output of FFT module 44, and thus degrades the demodulation performance of demodulator 48.

One of the dominant types of impairments, which cannot be corrected by post-processing of the FFT output, is Inter-Symbol Interference (ISI) caused by timing offset. As explained above, when applying FFT to the signal of a given TP, ISI will be minimal when the time interval provided to FFT module 44 is perfectly synchronized to the symbol timing of the signal. Such timing is referred to herein as nominal timing or zero timing offset.

When the actual timing of the FFT deviates from the nominal timing, in either direction, the level of ISI increases. Without loss of generality, transforming a time interval that precedes the nominal timing, i.e., beginning the FFT later than the nominal timing, is referred to as a negative timing offset. Providing the FFT with a time interval that starts later than the nominal timing, i.e., beginning the FFT earlier than the nominal timing, is referred to as a positive timing offset.

The concept of positive and negative timing offsets is illustrated in the inset at the bottom of FIG. 1. The graph shows an example of a wireless-channel delay profile of the signal of a certain TP. The delay profile comprises a sequence of channel taps having certain power levels and time delays. Typically, the optimal start time for the FFT is the end of the Cyclic Prefix (CP) that precedes the OFDM symbol, i.e., the beginning of the actual OFDM symbol. Three possible choices of timing, denoted 60A, 60B and 60C, are seen in the figure. Timing 60A has a positive timing offset, timing 60B has zero timing offset, and timing 60C has a negative timing offset.

It can be shown that the ISI caused by negative timing offset is considerably stronger than ISI caused by positive timing offset. A negative timing offset means that the OFDM symbol begins before the FFT begins, and therefore ends before the FFT ends. Therefore, the CP of the next OFDM symbol will partly overlap the end of the current FFT interval, and cause ISI.

A positive timing offset, on the other hand, is less harmful. With a positive timing offset, the CP of the current OFDM symbol will overlap the beginning of the FFT interval. Assuming the channel delay profile is shorter than the CP, initial positive timing offsets do no cause any ISI, and will only result in some effective phase rotation of the FFT output. Such a rotation typically can be corrected after the FFT.

An FFT with a negative timing offset typically results in a high noise floor that degrades the demodulation performance of demodulator 48 significantly, especially in high SNR conditions. This degradation is harmful, for example, to mechanisms such as COMP and NAICS that involve demodulation of neighbor-TP data channels, sometimes with high Modulation and Coding Schemes (MCS). U.S. Provisional Patent Application 62/088,018, cited above, provides a mathematical derivation that quantifies the ISI noise floor caused by negative timing offset, and the equivalent Error Vector Magnitude (EVM).

Figure 2:
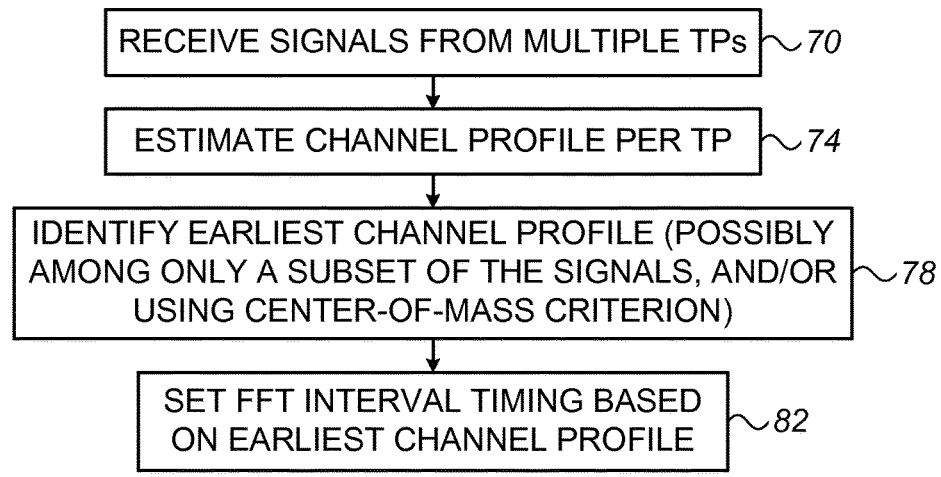
FIGS. 2-4 are flow charts that schematically illustrate methods for signal reception with reduced Inter-Symbol Interference (ISI), in accordance with embodiments that are described herein.
Figure 3:
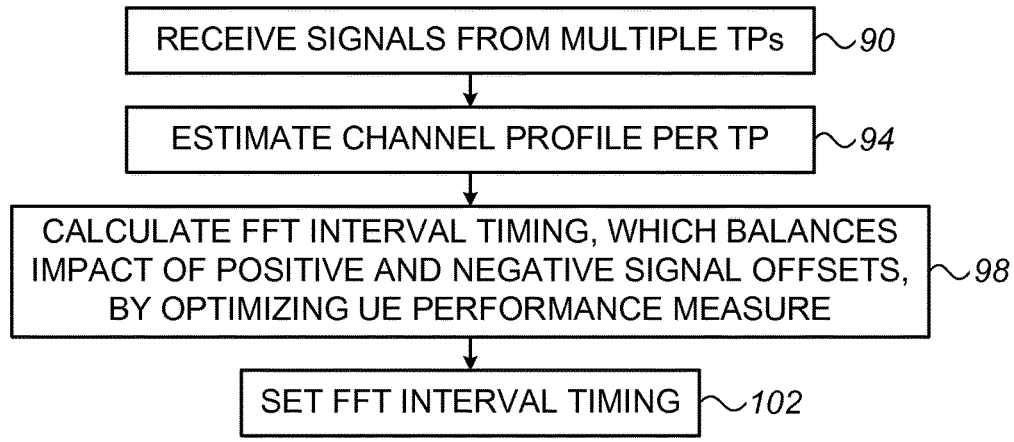
Figure 4:
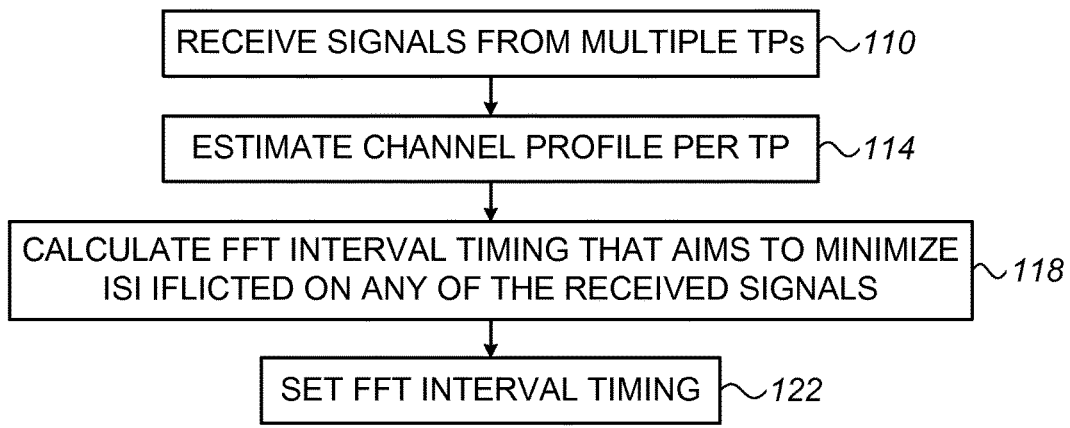

In various embodiments, processing circuitry 40 applies various methods for setting the timing of FFT module 40 in a manner that reduces ISI. FIGS. 2-4 illustrate several example methods. Alternatively, any other suitable method can be used. It should be noted that, since the disclosed methods take into consideration the signals received from multiple TPs, the resulting FFT timing is not necessarily synchronized with the TP that is assigned to serve UE 24.

FIG. 2 is a flow chart that schematically illustrates a method for signal reception with reduced ISI, in accordance with an embodiment that is described herein. The method begins with RF FE 36 receiving multiple OFDM signals from multiple TPs 28, at a reception operation 70. Channel estimation module 52 estimates the channel delay profile for the signal received from each TP, at a profile estimation operation 74.

At an earliest signal identification operation 78, timing adjustment module 56 identifies the earliest channel delay profile, i.e., the signal having the earliest arrival time at the UE. At a timing setting operation 82, timing adjustment module 56 adjusts the timing of FFT module 44, such that the beginning of the symbol interval being transformed coincides with this earliest arrival time. Setting the FFT timing to begin at the earliest arrival time prevents negative timing offsets, and therefore eliminates the severe ISI caused by negative timing offsets.

In one embodiment, timing adjustment module 56 defines the earliest arrival time as the arrival time of the first channel tap among the signals received from all TPs 28. In other embodiments, timing adjustment module 56 identifies the earliest arrival time only within a partial subset of the TPs.

In an example embodiment, timing adjustment module 56 defines the earliest arrival time as the arrival time of the first channel tap among the signals whose SNR exceeds a predefined threshold. This scheme prevents negative timing offsets only for signals that are strong enough to cause severe ISI. For weaker signals, negative timing offset is permitted.

In another example embodiment, timing adjustment module 56 defines the earliest arrival time as the arrival time of the first channel tap among the signals of the TPs whose transmissions are relevant to UE 24. Relevancy can be defined in different ways. In an embodiment, the relevant TPs are TPs that transmit data channels (e.g., Physical Downlink Shared Channels—PDSCH) that UE 24 is expected to demodulate, either for consumption or for interference cancellation. In an embodiment, timing adjustment module 56 identifies such relevant TPs by recording short-term statistics of data-channel transmissions by the various TPs.

Further alternatively, timing adjustment module 56 may identify the earliest arrival time within any other suitable subset of the TPs.

In the above examples, the arrival time of the signal from a given TP is defined as the arrival time of the earliest channel tap in the delay profile of that signal. In an alternative embodiment, timing adjustment module 56 defines the arrival time as a weighted average of the channel taps, e.g., the centroid ("center-of-mass") of the channel taps arrival times. The centroid timing can be written as $t_{center\_of\_mass} = \Sigma_i t_i P(t_i)/\Sigma_i P(t_i)$, wherein $t_i$ and $P(t_i)$ denote the arrival time and power level of the $i^{th}$ channel tap, respectively.

Further alternatively, timing adjustment module 56 may define the earliest arrival time in any other suitable way.

FIG. 3 is a flow chart that schematically illustrates a method for signal reception with reduced ISI, in accordance with an alternative embodiment that is described herein. In this embodiment, timing adjustment module 56 sets the start time for FFT module 44 in a manner that does not eliminate negative timing offsets, but rather balances the impact of negative and positive timing offsets. Typically, the FFT timing is set to a value that optimizes some reception performance measure.

The method of FIG. 3 begins with RF FE 36 receiving multiple OFDM signals from multiple TPs 28, at a reception operation 90. Channel estimation module 52 estimates the channel delay profile for the signal received from each TP, at a profile estimation operation 94. In an example embodiment, channel estimation module 52 estimates the channel delay profile by correlating the received signal with known Reference Signals (RSs), so as to reconstruct the delays and amplitudes of the various channel taps.

At a performance measure optimization operation 98, timing adjustment module 56 calculates a preferred FFT timing, e.g., a preferred start time for the OFDM symbol interval to be transformed by FFT module 44, based on a criterion that aims to optimize a desired reception performance measure. Module 56 sets the FFT timing accordingly, at a setting operation 102. In various embodiments, timing adjustment module 56 calculates and sets the FFT timing so as to optimize various performance measures. Several non-limiting examples are outlined below.

In some embodiments, the performance measure being optimized is the throughput (e.g., in bits per second) with which processing circuitry 40 is able to demodulate data channels (e.g., PDSCH). This scheme is useful, for example, in COMP schemes in which multiple TPs transmit data addressed to UE 24.

In an example embodiment, UE 24 has control over the scheduling of data channels addressed thereto by TPs 28, e.g., using Channel State Information (CSI) feedback. In this embodiment, processing circuitry 40 identifies the TP whose signal is received with the highest SNR at a given point in time. This identification can be made, for example, based on the power levels of the channel taps in the channel delay profiles estimated by channel estimation module 52. The UE requests that data channels will be transmitted thereto by the identified highest-SNR TP. In addition, timing adjustment module 56 sets the FFT timing to match the timing of this highest-SNR TP (i.e., so that the signal of the highest-SNR TP will have zero timing offset). This setting typically optimizes the data reception throughput of the UE. In particular, if the channel delay profile of the highest-SNR TP does not extend beyond the Cyclic Prefix (CP), ISI is zero, i.e., the Signal to Interference and Noise Ratio (SINR) equals the SNR. Note that this technique implicitly assumes that processing circuitry 40 estimates the SNR that the TP would have if it were received with zero timing offset, i.e., with zero SINR.

In another example embodiment, UE 24 does not have control over the scheduling of data channels addressed thereto by TPs 28, in which case the UE aims to maximize the capacity of the data channel for a given transmission pattern of the TPs. Assume, for example, that the wireless channels from all TPs 28 to UE 24 have flat (i.e., non-frequency-selective) frequency responses. The capacity of the data channel (e.g., PDSCH) from the $i^{th}$ TP to the UE can be written as $C_i = \log_2(1+SINR_i)$. The overall channel capacity from TPs 28 to UE 24 is thus:

$$C = \sum_i p_i C_i = \log_2 \prod_i (1 + SINR_i)^{p_i} \qquad \text{Equation 1}$$

wherein $p_i$ denotes the probability that the $i^{th}$ TP will transmit a data channel to UE 24.

The overall channel capacity as a function of the FFT timing t can be written as:

$$C(t) = \sum_i p_i C_i(t) = \log_2 \prod_i \left(1 + \frac{E_{TOT,i}}{E_N + ISI_{POW,i}(t)}\right)^{p_i} \qquad \text{Equation 2}$$

wherein $E_{TOT,i}$ denotes the overall energy of the signal received from the $i^{th}$ TP (the sum of power levels of the taps in the channel delay profile of the i$^{th}$ TP). ISI$_{POW,i}$(t) denotes the power of the ISI noise floor caused by the signal received from the i$^{th}$ TP. E$_N$ denotes the thermal noise power.

In some embodiments, timing adjustment module 56 finds the FFT timing t for which the overall channel capacity C(t) of Equation 2 is maximal, and sets the FFT timing to this value.

FIG. 4 is a flow chart that schematically illustrates a method for signal reception with reduced ISI, in accordance with yet another embodiment that is described herein. In this embodiment, timing adjustment module 56 sets the FFT timing in a manner that minimizes the worst-case ISI, i.e., minimizes the ISI inflicted on any of the multiple signals received from TPs 28. This approach is useful, for example, when all TPs have similar importance with regard to ISI minimization.

In this embodiment, UE 24 does not necessarily receive data channels (e.g., PDSCH) addressed thereto from all the TPs, but the UE does demodulate the signals received from the various TPs, e.g., for interference cancellation. In another example use-case, the UE may aim to achieve uniform demodulation performance for the signals of the various TPs, instead of maximizing the overall received data throughput.

The method of FIG. 4 begins with RF FE 36 receiving multiple OFDM signals from multiple TPs 28, at a reception operation 110. Channel estimation module 52 estimates the channel delay profile for the signal received from each TP, at a profile estimation operation 114.

At an optimization operation 118, timing adjustment module 56 calculates a preferred FFT timing, e.g., a preferred start time for the OFDM symbol interval to be transformed by FFT module 44, based on a criterion that aims to minimize the ISI inflicted on any of the multiple received signals. Module 56 sets the FFT timing accordingly, at a setting operation 122. Several non-limiting examples of such an optimization are given below.

In one embodiment, timing adjustment module 56 sets the FFT timing so as to minimize the worst-case Error Vector Magnitude (EVM) inflicted by ISI on any of the multiple signals received from the multiple TPs. This scheme is useful, for example, when demodulator demodulates data channels from all the TPs with the same MCS and expected Block Error Rate (BLER). In this embodiment, thermal noise is assumed to be zero, or at least negligible, for simplicity.

Consider, for example, a simplified scenario of two TPs 28, one having a positive timing offset and the other having a negative timing offset. (A more general case is discussed further below.) In the present scenario, module 56 sets the FFT timing such that EVM$_{ISI,N}$=EVM$_{ISI,P}$, wherein EVM$_{ISI,N}$ denotes the EVM caused by the signal having the negative timing offset, and EVM$_{ISI,P}$ denotes the EVM caused by the signal having the positive timing offset. In an embodiment, module 56 calculates this FFT timing, denoted t, by finding the timing back-off t (relative to the current timing) that satisfies the condition:

$$\frac{EVM_{ISI,N}}{EVM_{TOT,N}}(l_{OFF,N} - t) = \frac{EVM_{ISI,P}}{EVM_{TOT,P}}(l_{OFF,P} + t - l_{CP}) \quad \text{Equation 3}$$

wherein $l_{OFF,N}$ denotes the length of time by which the signal having the negative timing offset extends beyond the CP boundaries, $l_{OFF,P}$ denotes the length of time by which the signal having the positive timing offset extends beyond the CP boundaries, and $l_{CP}$ denotes the time duration of the CP.

The optimal timing can be written as:

$$t_{OPT} = -\frac{R_P(l_{OFF,P} - l_{CP}) + R_N l_{OFF,N}}{R_N + R_P} \quad \text{Equation 4}$$

wherein $R_X = E_{ISI,X}/E_{TOT,X}$ denotes the ration between the signal energy causing ISI and the total signal energy.

In another embodiment, timing adjustment module 56 sets the FFT timing so as to maximize the worst-case SINR at demodulator 48, taken over the multiple signals received from the various TPs. This scheme is useful, for example, when thermal noise is not negligible relative to ISI.

Equivalently, this scheme can be expressed as maximizing the worst-case Noise-and-Interference to Signal Ratio (NISR), given by:

$$NISR = SINR^{-1} = \frac{E_N + ISI_{POW}}{E_{TOT}} = SNR^{-1} + EVM_{ISI} \quad \text{Equation 5}$$

Therefore, the optimization goal of module 56 is to set the timing back-off t (relative to the current timing) that satisfies:

$$\arg\min_{t}\{\text{Max}[\text{Max}NISR_P(t), \text{Max}NISR_N(t)]\} \quad \text{Equation 6}$$

wherein MaxNISR$_P$(t) denotes the maximal NISR of the signal having the positive timing offset as a function of t, and MaxNISR$_N$(t) denotes the maximal NISR of the signal having the negative timing offset as a function of t. Detailed expressions for MaxNISR$_P$(t) and MaxNISR$_N$(t) are given in U.S. Provisional Patent Application 62/088,018, cited above. It can be shown that for the optimal back-off t, the positive and negative worst-case NISR values are equal to one another.

In an alternative embodiment, timing adjustment module 56 sets the FFT timing so as to maximize the worst-case SINR (or maximal NISR), while assigning different weights to signals of different TPs. This approach is useful, for example, is scenarios where ISI is more tolerable in the signals of some TPs, and less tolerable in the signals of other TPs. For example, in interference cancellation schemes such as FeICIC, it is typically much more important for the UE performance to reduce ISI in the signal received from the serving TP. The UE can typically tolerate higher ISI levels in the signals received from the interfering TPs.

Thus, in some embodiments, timing adjustment module 56 assigns each TP a respective weight that is indicative of the relative importance of minimizing the SINR of the signal received from that TP. The weight of a TP may depend on any suitable factor. Example factors include whether the TP signal is received for the purpose of demodulation (consumption) or for interference cancellation; whether control or data (or both) are received from the TP; the MCS used by the TP for data transmission; the SNR with which the signal is received from the TP; and/or the percentage of time the TP transmits data that is relevant to the UE.

By applying the different weights to the expressions in Equations 5 and 6, module 56 is able to find the FFT timing that maximizes the worst-case weighted SINR. Detailed expressions are given in U.S. Provisional Patent Application 62/088,018, cited above.

In yet another embodiment, timing adjustment module 56 sets the FFT timing so as to minimize the worst-case ISI-induced noise power in any of the signals received from TPs 28. This approach is useful, for example, when some of the signals are non-colliding interfering signals, which cause interference to the serving TP signal and which the UE is required to cancel.

The assumption is that the UE is able to estimate and cancel the interference successfully, up to some residual ISI. In other words, residual non-ISI impairments are not taken into account in the present example.

The ISI caused by the signals of the various TPs induces different noise floors (and therefore different SINRs) onto the PDSCH allocation resources after interference cancellation. It can be shown that setting the FFT timing in a manner that maximizes the achievable UE throughput is equivalent to maximizing the Exponential Effective SNR Metric (EESM). Therefore, module 56 may calculate the optimal timing t by optimizing:

$$t = \operatorname*{argmax}_{t} \{EESM(t)\} \approx \operatorname*{argmax}_{t} \left\{ \sum_{i} e^{-\beta \cdot SINR_i(t)} \right\} \quad \text{Equation 7}$$

It can be seen from Equation 7 that the EESM is maximized by aiming to reach a uniform SNR among the allocated PDSCH resources, i.e., among the ISI noise floors of the signals received from the various TPs.

Consider, for simplicity, a scenario involving two interfering TPs, one having a positive timing offset and the other having a negative timing offset. At the optimal FFT timing, the ISI power in both signals is equal, i.e., $ISI_{POW,N} = ISI_{POW,P}$. The optimal FFT timing back-off t (relative to the current timing) that is set by module 56 is thus given by:

$$t_{OPT} = -\frac{E_{ISI,P}(l_{OFF,P} - l_{CP}) + E_{ISI,N} l_{OFF,N}}{E_{ISI,P} + E_{ISI,N}} \quad \text{Equation 8}$$

In still another embodiment, timing adjustment module 56 sets the FFT timing so as to minimize the overall sum of powers of the ISI-induced noise, taken over the signals received from the multiple TPs. This approach is useful, for example, when some of the signals are colliding interfering signals, which cause interference to the serving TP signal and which the UE is required to cancel. The assumption is that the overall ISI in the received signal is indicative of the residual noise after interference cancellation.

The optimal timing under these conditions is given by:

$$\operatorname*{arg\,min}_{t} \sum_{i} ISI_{POW,i} \quad \text{Equation 9}$$

Splitting this expression into separate terms for positive and negative timing offset yields:

$$t = \operatorname*{arg\,min}_{t} \left\{ \sum_{i} ISI_{POW,N_i}(t) + \sum_{j} ISI_{POW,P_j}(t) \right\} = \ldots = \quad \text{Equation 10}$$

-continued $$\operatorname*{arg\,min}_{t} \left\{ t \left[ \sum_{i} R_{P,i} E_{TOT,P,i} - \sum_{j} R_{N,j} E_{TOT,N,j} \right] \right\}$$

The derivation above makes an implicit assumption that the formula for ISI is valid for every value of t. In practice, the formula holds only when ISI is present. Therefore, in this embodiment, module 56 should set the optimal timing either to the beginning of one of negative channel delay profiles (if the absolute ISI power due to negative offset is larger), or otherwise to the beginning of some positive channel delay profile.

Since in most real-life channels the energy ratio $R_N$ participating in negative-offset ISI is much higher than $R_P$, it is typically preferable to set the FFT timing to the beginning of one of negative channel delay profiles (unless the channels related to negative offsets have too little energy).

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a receiver, receiving a superposition of multiple signals originating from multiple transmitters;
   in the receiver, transforming a symbol interval of the superposition into a frequency domain, and setting a start time of the symbol interval to be transformed in accordance with a criterion that reduces Inter-Symbol Interference (ISI) in the transformed symbol interval, by identifying and setting the start time that optimizes a received data throughput of the receiver; and
   demodulating at least one of the multiple signals in the receiver using the transformed symbol interval.

2. The method according to claim 1, wherein the multiple signals originate from respective cells of a wireless network, wherein one of the multiple signals originates from a serving cell that is assigned to serve the receiver in the wireless network, and wherein setting the start time comprises choosing for the receiver a timing that is not synchronized with the serving cell.

3. A method, comprising:
   in a receiver, receiving a superposition of multiple signals originating from multiple transmitters;
   in the receiver, transforming a symbol interval of the superposition into a frequency domain, and setting a start time of the symbol interval to be transformed in accordance with a criterion that reduces Inter-Symbol Interference (ISI) in the transformed symbol interval, by identifying and setting the start time that minimizes the ISI inflicted on any of the signals; and demodulating at least one of the multiple signals in the receiver using the transformed symbol interval.

4. The method according to claim 3, wherein identifying the start time comprises finding the start time that minimizes a worst-case Error Vector Magnitude (EVM) induced by the ISI in any of the signals.

5. The method according to claim 3, wherein identifying the start time comprises finding the start time that maximizes a worst-case Signal to Interference and Noise Ratio (SINR) caused by the ISI in any of the signals.

6. The method according to claim 5, wherein finding the start time comprises weighting respective SINRs of the signals with respective weights, and finding the start time that maximizes a worst-case among the weighted SINRs.

7. The method according to claim 3, wherein identifying the start time comprises finding the start time that minimizes a worst-case residual noise power induced by the ISI in any of the signals.

8. A method, comprising:
in a receiver, receiving a superposition of multiple signals originating from multiple transmitters;
in the receiver, transforming a symbol interval of the superposition into a frequency domain, and setting a start time of the symbol interval to be transformed in accordance with a criterion that reduces Inter-Symbol Interference (ISI) in the transformed symbol interval, by identifying and setting the start time that minimizes a total noise power induced by the ISI in the multiple signals; and
demodulating at least one of the multiple signals in the receiver using the transformed symbol interval.

9. Apparatus, comprising:
a receiver front end, configured to receive a superposition of multiple signals originating from multiple transmitters; and
processing circuitry, configured to transform a symbol interval of the superposition into a frequency domain, to set a start time of the symbol interval to be transformed in accordance with a criterion that reduces Inter-Symbol Interference (ISI) in the transformed symbol interval, by identifying and setting the start time that optimizes a received data throughput, and to demodulate at least one of the multiple signals using the transformed symbol interval.

10. The apparatus according to claim 9, wherein the multiple signals originate from respective cells of a wireless network, wherein one of the multiple signals originates from a serving cell that is assigned to serve the apparatus in the wireless network, and wherein the processing circuitry is configured to set the start time by choosing a timing that is not synchronized with the serving cell.

11. A mobile communication terminal comprising the apparatus of claim 9.

12. A chipset for processing signals in a mobile communication terminal, comprising the apparatus of claim 9.

13. Apparatus, comprising:
a receiver front end, configured to receive a superposition of multiple signals originating from multiple transmitters; and
processing circuitry, configured to transform a symbol interval of the superposition into a frequency domain, to set a start time of the symbol interval to be transformed in accordance with a criterion that reduces Inter-Symbol Interference (ISI) in the transformed symbol interval, by identifying and setting the start time that minimizes the ISI inflicted on any of the signals, and to demodulate at least one of the multiple signals using the transformed symbol interval.

* * * * *